(12) United States Patent
Lieberman (10) Patent No.: US 6,977,758 B2
(45) Date of Patent: Dec. 20, 2005

(54) HALFTONE DOT ENCODING (75) Inventor: David J. Lieberman, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 159 days.

(21) Appl. No.: 10/672,209

(22) Filed: Sep. 26, 2003

(65) Prior Publication Data

US 2005/0068588 A1 Mar. 31, 2005

(51) Int. Cl.[7] .................. H04N 1/405; H04N 1/409
(52) U.S. Cl. .................. 358/3.06; 358/3.26; 358/1.2
(58) Field of Search .................. 358/1.9, 1.2, 3.06, 358/3.07, 3.09, 3.11, 3.2, 534, 3.26, 3.27; 382/323, 233, 298, 299

(56) References Cited

U.S. PATENT DOCUMENTS 6,175,653 B1 * 1/2001 de Queiroz .................. 382/233
6,650,793 B1 * 11/2003 Lund et al. .................. 382/299
6,804,417 B1 * 10/2004 Lund et al. .................. 382/299

OTHER PUBLICATIONS

U.S. Appl. No. 10/354,385, filed Jan. 30, 2003, Lieberman et al.

* cited by examiner

Primary Examiner—Scott A. Rogers
(74) Attorney, Agent, or Firm—Oliff & Berridge, PLC (57) ABSTRACT

There is disclosed in embodiments methods for halftone dot encoding for engine-dependent-rendering. The methods first carefully design an asymmetric halftone dot for a specific printer and then utilizes a halftone dot encoding algorithm, which encodes the asymmetric halftone dot into a symmetric format. The asymmetric halftone dot design is satisfies the requirements of raster output scanner electronics, as well as several engine dependent constraints. These include: rotation insensitivity, minimum dot size, minimum hole size, minimum appendage, and minimum cavity. The symmetric dot encoding allows perfect reconstruction of the binaries that may have been generated using the original asymmetric dot. This reconstruction is achieved using imbedded binary resolution conversion. In this way, this resolution conversion is acting as a decoder.

21 Claims, 8 Drawing Sheets

HALFTONE DOT ENCODING

BACKGROUND

1. Technical Field

The present invention in embodiments generally relates to the art of image processing. The in embodiments shall be described in reference to electrophotographic applications, such as, for example, xerographic imaging. However, the invention can be applied in other areas, such as, for example, video image processing and lithographic systems.

2. References

In electronic imaging systems, images, such as, for example, pages of a document, are described in terms of high-level image or page description languages (PDL). Postscript™ is one such page description language well known in the art. In order to render an image, an image processor generates a binary image from the page description language description of the image. The binary image or bit map is in the form of a grid work or raster of mark/no mark decisions. The generation of a binary image from a page description language version of the image is referred to as raster image processing (RIP). In electrophotographic systems, a raster output scanner (ROS) controls a marking engine to place spots of ink, toner, or other colorants on a print medium according to the binary mark/no mark decisions indicated in the bit map.

To achieve high print quality, it is necessary to RIP documents to a high resolution. Typically, these resolutions are symmetric. For example, resolutions such as 600×600, 1200×1200, 1800×1800, or 2400×2400 dpi are common. For instance, these symmetric resolutions are supported by standard Postscript™ interpreters. However, due to optical and mechanical constraints and economic factors, raster output scanner (ROS) electronics are often designed to support asymmetric high addressable resolutions, such as 1200×600, 1800×600, 2400×600, and 4800×600 instead of the symmetric resolutions mentioned above. Occasionally, the reverse situation applies. In either case, a resolution conversion is required to make the output of the raster image processor (RIPer) compatible with the raster output scanner (ROS) electronics.

Any digital printer, digital front end (DFE), and fax machine can avoid objectionable artifacts associated with binary video path operations by encoding their halftone dots and decoding their binary. The encoding is used to avoid the generation of undesirable (highly stressful) binary patterns. In the past, these stressful patterns were created unintentionally, and print quality suffered.

Most digital front ends employ a standard rendering method, such as Postscript™. These methods typically produce symmetric resolution binaries such as 1200×1200. However, because of limitations associated with optics and characteristics of xerography, it is more appropriate to drive the ROS electronics of a printer with asymmetric high addressable binaries such as 2400×600. However, the required binary resolution conversion step (combined with optional binary rotation) can result in the creation of undesirable (highly stressful) binary patterns that significantly degrade pictorials. This can be avoided by using a symmetric halftone dot that is actually an encoding of an asymmetric dot, and by using the binary resolution converter as a binary decoder.

SUMMARY

There is disclosed in embodiments a method for halftone dot encoding for engine-dependent-rendering. The method in embodiments optimize asymmetric halftone dots by encoding the asymmetric halftone dot into a symmetric resolution format; and generates high resolution symmetric binaries using the encoded dots wherein the resulting binaries will be decoded by a printers imbedded binary resolution conversion algorithm.

The method first carefully designs an asymmetric halftone dot for a specific printer and then utilizes a halftone dot encoding algorithm, which encodes the asymmetric halftone dot into a symmetric format. The asymmetric halftone dot design is should satisfy the requirements of the raster output scanner (ROS) electronics, as well as several engine dependent constraints. These include: rotation insensitivity, minimum dot size, minimum hole size, minimum appendage, minimum cavity, and improved repeatability using a midtone hybrid line screen. The symmetric dot encoding allows for perfect reconstruction of the binaries that may have been generated using the original asymmetric dot. This reconstruction is achieved using imbedded binary resolution conversion. In this way, this resolution conversion is acting as a decoder.

BRIEF DESCRIPTION OF THE DRAWINGS

The drawings are not to scale and are only for purposes of illustration and are not to be construed as limiting the invention.

FIGS. 8(*a*) and (*b*) are symmetric 1200×1200 binary images illustrating the difference between the traditional dot design methods FIG. 8(*a*) used before this invention, and the new approach FIG. 8(*b*) using the method of FIG. 1 to generate, convert, or encode a halftone dots.

FIGS. 9(*a*) and (*b*) are binary images illustrating results of using the traditional method FIG. 9(*a*), and the new method FIG. 9(*b*) of FIG. 1 to generate, convert, or encode a halftone dots.

DETAILED DESCRIPTION

Disclosed are methods in embodiments for halftone dot encoding for engine-dependent-rendering. The method in embodiments optimize asymmetric halftone dots by encoding the asymmetric halftone dot into a symmetric resolution format; and generates high resolution symmetric binaries using the encoded dots wherein the resulting binaries will be decoded by a printers imbedded binary resolution conversion algorithm.

Figure 1:
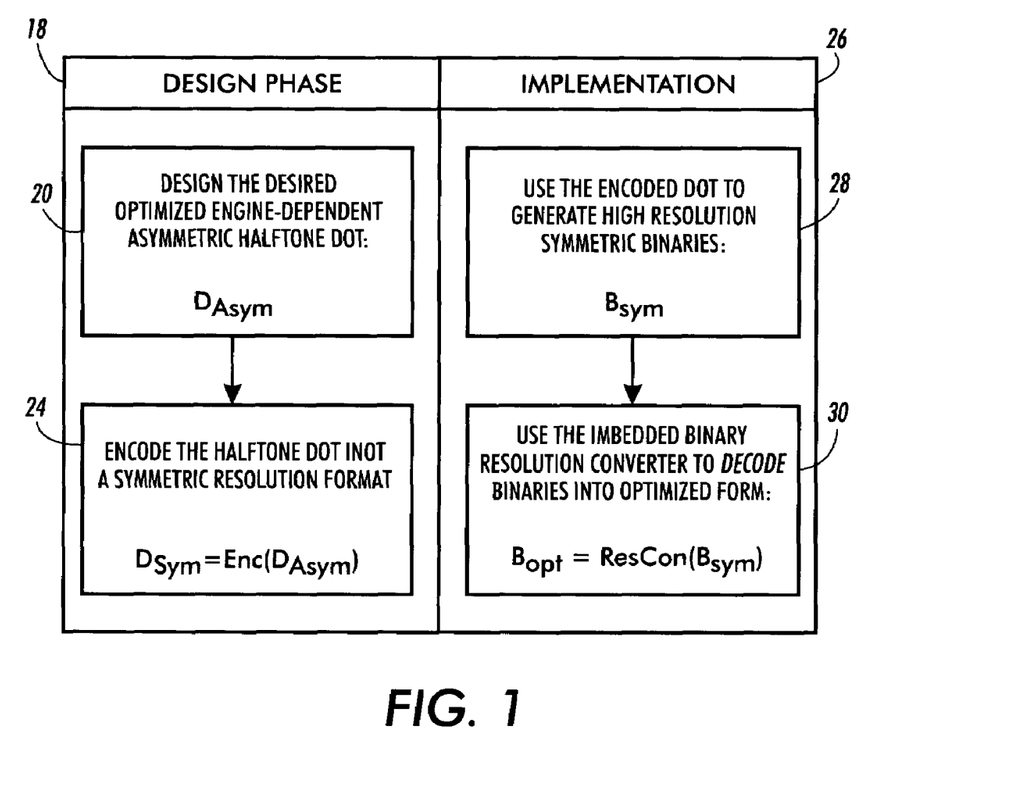
FIG. 1 is a flow chart outlining a method for halftone dot encoding

A method for halftone dot encoding is illustrated in FIG. 1 using a two-stage process, design and implementation, respectively. In the design phase 18, halftone dot designs 20 and dot encoding algorithm 24 are developed offline for a specified printer. The halftone dot design 20 is adapted to the (asymmetric) raster output scanner (ROS) electronics and to the characteristics of a marking engine. Next, these dots are encoded 24 into a symmetric format that is Postscript™ compatible. In the implementation portion 26 of the method, the encoded dots are loaded into a digital front end (DFE). When a document is rendered, the resulting binaries 28 exhibit the patterns of the encoded halftone dot. These encoded binaries must be recovered (decoded) by the imbedded resolution conversion 30 supported by the printer's binary video path.

The methods illustrated herein first carefully designs an asymmetric halftone dot for the specific printer and then utilizes the halftone dot encoding algorithm, which encodes the asymmetric halftone dot into a symmetric format. The asymmetric halftone dot design satisfies the requirements of the raster output scanner (ROS) electronics, as well as several engine dependent constraints. These include: rotation insensitivity, minimum dot size, minimum hole size, minimum appendage, minimum cavity, and improved repeatability using a mid-tone hybrid line screen.

Figure 2A:
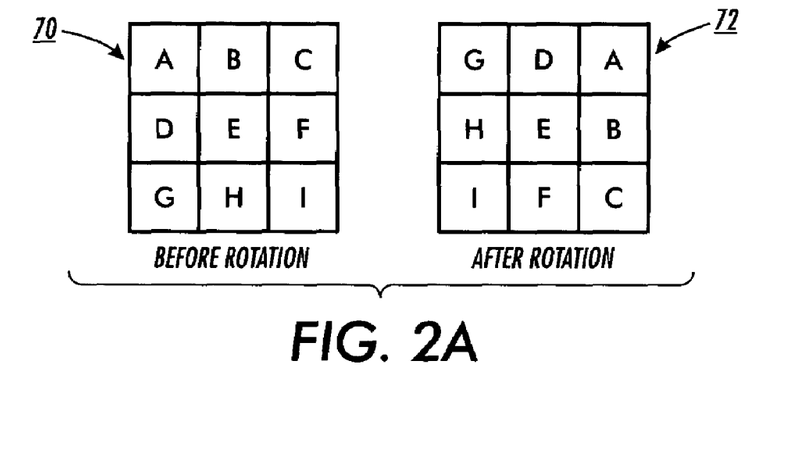
FIG. 2A graphically illustrates a binary image before and after rotation.
Figure 2B:
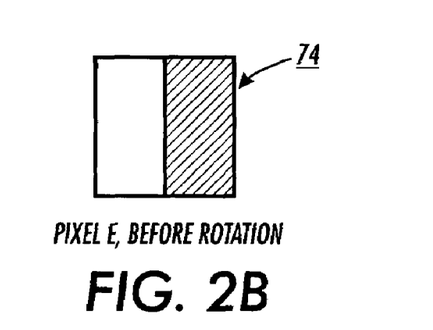
FIG. 2B graphically illustrates a pixel image before rotation.
Figure 2C:
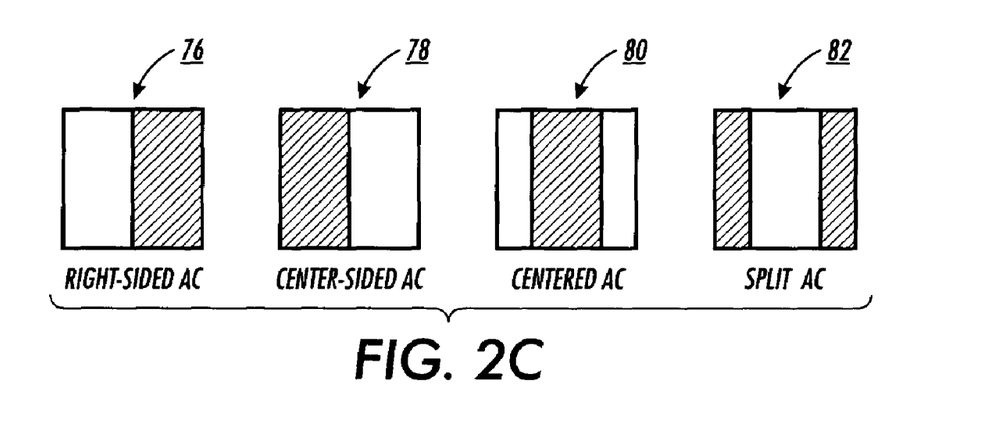
FIG. 2C graphically illustrates repositioned area coverage.

To achieve rotation insensitivity, FIG. 2 graphically illustrates how the rotation is achieved. Referring to FIG. 2 a collection of 600 dpi imaging areas 70 enumerated as pixels A through I, are shown. After binary rotation is performed, these imaging areas 72 will be rearranged, but the area coverage of each of these imaging areas is preserved. However, the positioning of partially covered 'gray' areas will change depending on context. If pixel E initially has 50% area coverage (AC) 74, as graphically illustrated in FIG. 2B, after rotation is performed the repositioned area coverage can be assigned to any of the left 76, right 78, centered 80, or split candidates 82 graphically illustrated and shown in FIG. 2C. The decision on which candidate to choose is based on one objective: To minimize transitions by achieving compact dot growth (CDG).

Minimum dot clusters (holes) are the smallest robust imageable dot cluster (hole). Clusters (holes) that are smaller than this size will either fail to develop, their appearance will vary dramatically from one cluster to the next, or their appearance will vary as a function of environmental factors such as temperature and atmospheric pressure. Clusters (holes) that are equal to or greater than this minimum size will not have these instabilities and/or dependencies. Similar remarks can be said about minimum appendages (cavities). Above this minimum, the addition of an appendage (cavity) on a dot cluster (hole) will consistently contribute to the development of a cluster (hole). The appearance of these clusters (holes) will not vary dramatically from one to another, and will not be subject to environmental dependencies.

If a dot profile design conforms to these constraints, then halftones of a grayscale sweep will exhibit a smooth appearance with low levels of non-uniformity. When these constraints are not adhered to, sudden changes in appearance are evident at the locations corresponding to the presence of sub-minimum dots, holes, appendages, and cavities, and increased levels of non-uniformity are evident.

Figure 3:
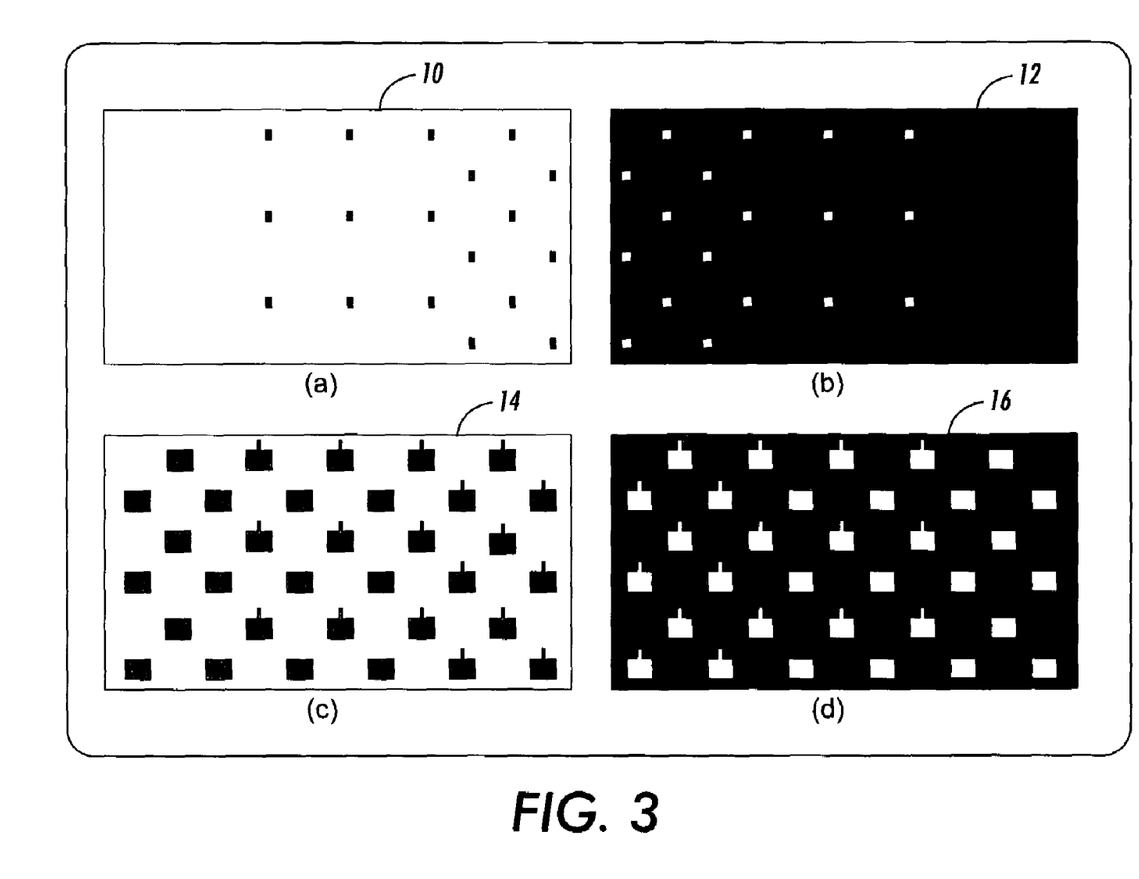
FIG. 3 graphically illustrates several engine dependent parameters associated with optimizing halftone dot design.

The engine dependent halftone dot design is designed at the same resolution typically supported by the ROS electronics; that is 2400×600. In addition, as noted above, the dot must comply with a minimum dot and hole size, minimum appendage, minimum cavity requirement, rotation insensitivity, and improved midtone repeatability. These requirements are illustrated in FIG. 3. In FIGS. 3(a) through (d), a halftone dot is used to generate binaries that increase in area coverage from left to right using dithering. The minimum dot and hole specifications are the marking engine dependent limits for patterns that can be imaged reliably. For a typical print engine, this is a 1200×600 minimum dot 10 and a 600×600 minimum hole 12, as illustrated in FIGS. 3(a) and (b), respectively. Typically, dot growth dictates that minimal holes are larger than minimal dots on a write black engine.

The minimum appendage 14 and cavity 16 requirements are required for achieving robust and repeatable xerographic development (and print quality). In FIG. 3(c), appendages 14 are added in minimal increments of 2400×600 for a typical print engine. Typically, a minimal appendage is smaller than that of the minimal dot requirement because connected dot cluster provides a stabilizing influence on the development of the appendage. However, the halftone dot growth profile is designed to avoid using more than a one appendage at any given gray level. In addition, the growth profile will expedite the replacement of these 2400×600 appendages with more repeatable 1200×600 appendages. Lastly, in FIG. 3(d) the minimal cavities 16 requirement is evident. In general, the minimum cavity is smaller than the minimal hole requirement because the connected hole cluster provides a stabilizing influence on the development of the cavity. Using the dot, hole, appendage and cavity parameter values in combination with the dot cluster growth rules described above is sufficient for realizing binaries that will elicit a robust and repeatable xerographic response.

More particularly, in FIGS. 3(a) through (d), a halftone dot is used to generate binaries that increase in area coverage from left to right. In FIGS. 3(a) and (b), the area coverage increments are subject to minimal dot and hole size requirements. In FIGS. 3(c) and (d), the minimal appendage and cavity requirements are evident.

Figure 4:
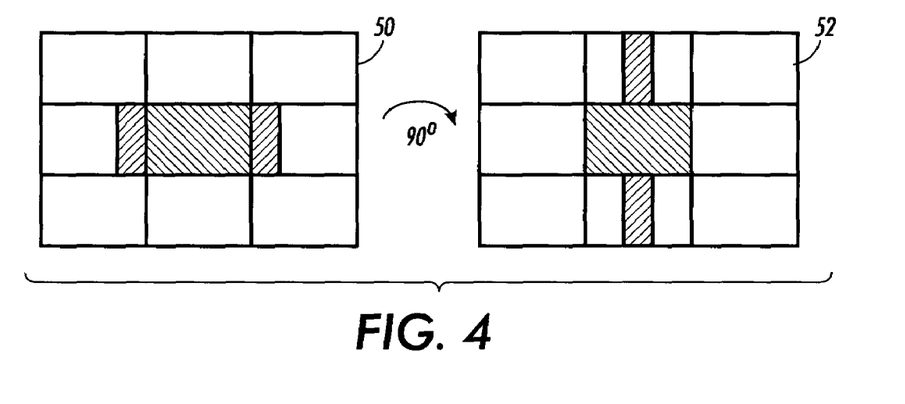
FIG. 4 graphically illustrates a dot pattern that exhibits rotation sensitivity.
Figure 5:
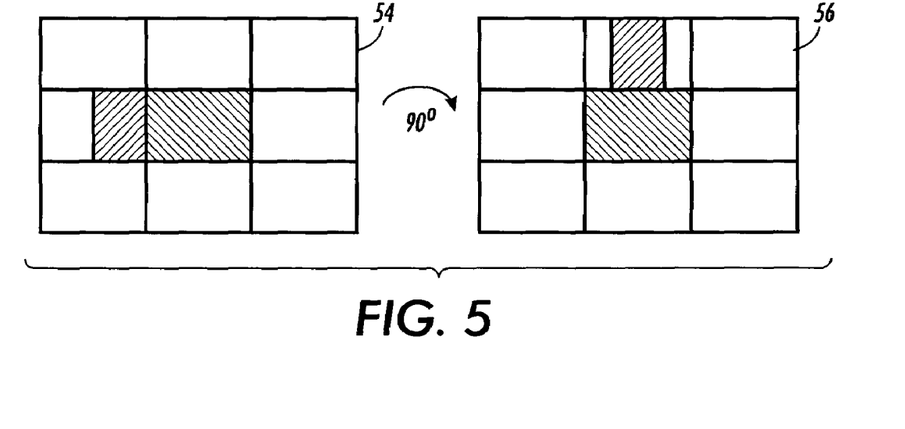
FIG. 5 graphically illustrates a dot pattern that is rotationally insensitive and more repeatable.

A dot designed to exhibit rotation insensitivity and improved repeatability is one that guarantees that the original and rotated binary patterns can achieve CDG. Referring to the small dot cluster 50 illustrated in FIG. 4, the binary pattern appears to exhibit CDG. However, if this binary pattern is rotated 52, two (2) small appendages are created; these two narrow appendages are stressful to a xerographic engine. An alternative dot growth pattern is shown in FIG. 5. The cluster 54 exhibits CDG before rotation, and if rotation 56 is applied, only one wide (and therefore stable and repeatable) appendage is generated. Therefore, the binary pattern 54 shown in FIG. 5 is comparatively rotationally insensitive and repeatable compared to the binary pattern 50 shown in FIG. 4.

Figure 6:
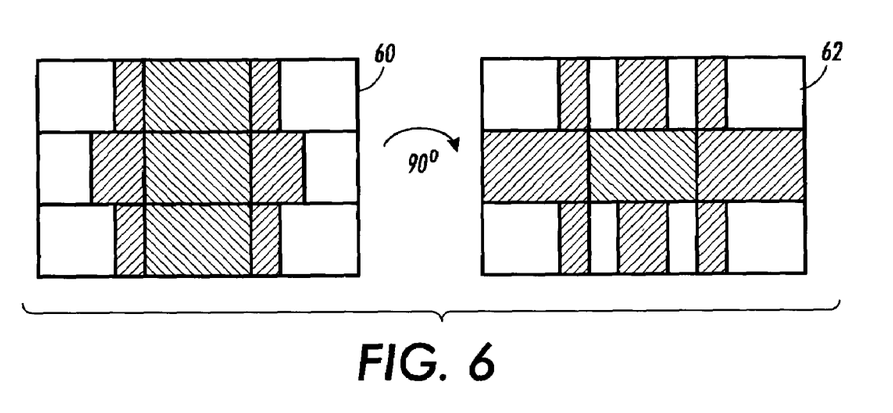
FIG. 6 graphically illustrates a dot pattern that exhibits rotation sensitivity.
Figure 7:
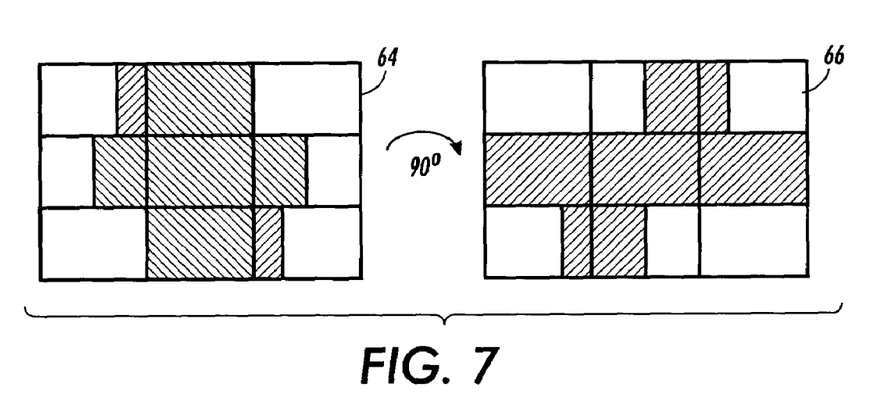
FIG. 7 graphically illustrates a dot pattern that is rotationally insensitive and more repeatable.

As another example, consider the binary pattern 60 graphically illustrated in FIG. 6. If this binary pattern 60 is rotated ninety degrees (90°), a binary pattern 62 having six (6) narrow appendages is generated. Sometimes these narrow appendages will fail to be imaged, sometimes development will leap across the narrow white areas between the appendages, and sometimes development will vary from one dot cluster to another. As a result, these stresses will produce non-uniformity and decrease repeatability. An alternative dot growth pattern 64 is shown in FIG. 7. This cluster exhibits CDG before and after rotation 66.

In general, dot cluster growth profiles will need to be hand-tuned. In this way, the binary patterns generated at each and every gray level will exhibit CDG in both their original and rotated orientation. Based on the examples above, it is clear that if three consecutive imaging areas have partial area coverage, then CDG can not be achieved. Combining this fact with a binary rotation insensitivity requirement results in the following dot cluster profile growth rules: 1) dots must be designed to guarantee that at no point may they have three consecutive (vertical or horizontal) imaging areas having partial area coverage, and 2) no dot cluster (hole) of any size is permitted to have more than one stressful appendage (cavity). Once these requirements are satisfied, the encoded symmetric binaries (that are generated using the dot design described above) may be rotated, and the resolution conversion algorithm may regenerate the same appendage and cavity requirements described above.

Lastly, a dot-encoding algorithm is required. In general, the encoding algorithm will vary with the imbedded binary resolution conversion algorithm supported by a printer's video path. As taught by Applicant's previously filed patent application Xerox Docket Number 2071 and incorporated by reference herein, a resolution conversion algorithm for a typical printer that may be used is MPPM (Morphological partial pixel mapping), which converts 1200×1200 binary into 2400×600 binary. Referring to the desired asymmetric halftone dot as Dasy and the encoded halftone dot as Denc. It can be shown that:

Denc=MPPM$^{-1}$ (Dasy), where MPPM$^{-1}$ resembles an inverse of the MPPM algorithm.

Figure 8A:
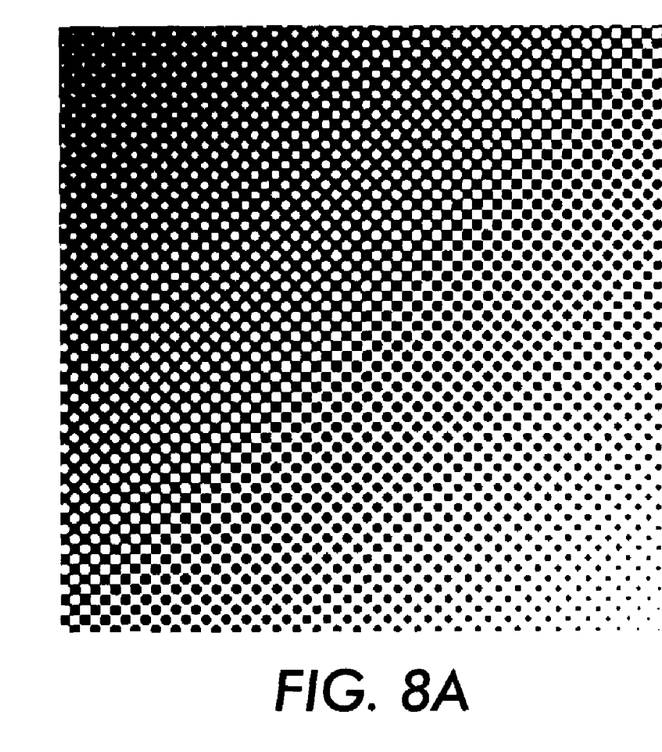
Figure 8B:
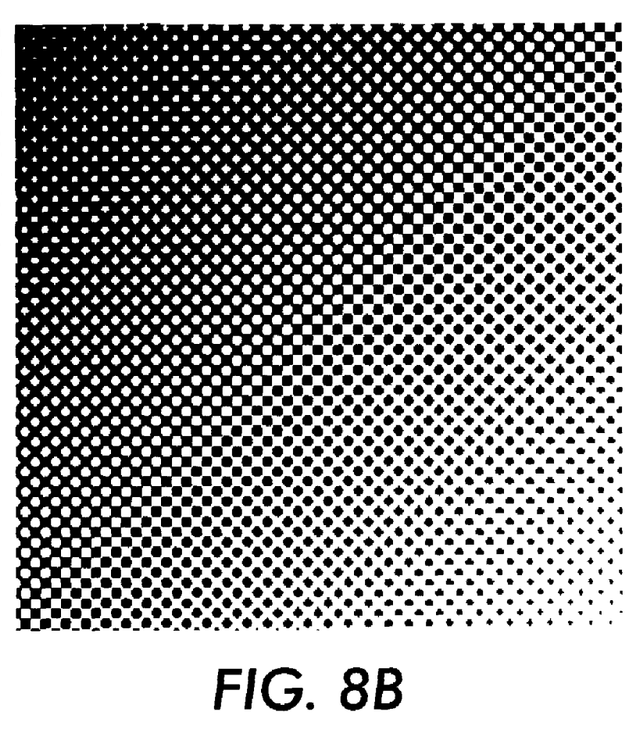

MPPM$^{-1}$ is not an inverse of MPPM (hence the italic font). MPPM operates upon symmetric binary video (Bsym) with values of 0 and 1 and generates asymmetric binary (Basy), whereas the MPPM$^{-1}$ operates upon threshold values of a halftone dot, typically in the range 0 to 255. Formally, for all gray levels g (0 to 255), the asymmetric dot design generates a plurality of corresponding binary patterns 1) Dasy(g)=Basy. The objective is to find the symmetric dot Dsym such that 2) Dsym(g)= Bsym, where the property 3) MPPM(Basy)=Basy holds for all g. Plugging 1) and 2) into 3) yields 4) MPPM(Dsym(g))=Dasy(g) and thus, Dsym(g) =MPPM$^{-1}$ (Dasy(g)). That is, to achieve a successful encoding, at each and every gray level (from 0 to 255), the binary that MPPM outputs is identical to the binary that is generated by applying MPPM to the binaries generated by the encoded dot. To appreciate the value of this encoding, see the binaries illustrated in FIG. 8.

In FIG. 8A, a 1200×1200 halftone dot design with a circular growth profile is illustrated. No attempt is made to accommodate the characteristics of the engine xerography, nor the behavior of the imbedded binary resolution conversion algorithm. In FIG. 8B, the 1200×1200 halftone dot that is an encoded version of a 2400×600 dot (that is constrained to comply with a minimum dot, hole, appendage, cavity, and rotation insensitivity constraint). In addition, these constraints were imposed at a resolution of 2400×600, and the resulting dot was then encoded into the 1200×1200 dot as shown in FIG. 8B. It should be noted that at this resolution, the binary patterns in FIG. 8A appear to be more compact than the patterns in FIG. 8B.

Figure 9A:
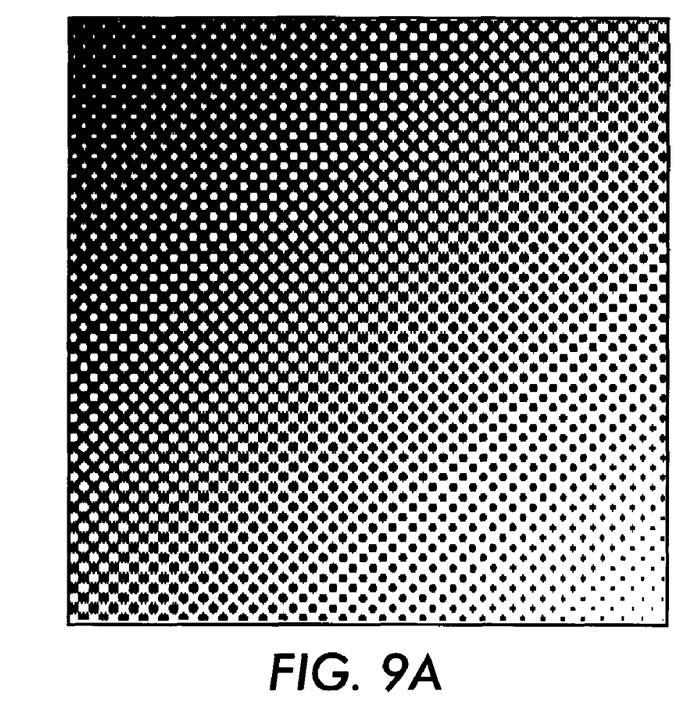

After the MPPM resolution conversion is applied to the 1200×1200 binaries of FIG. 8A, the binaries of FIG. 9A are produced. It should be noted that the appendages created along the top and bottom of many of the dots and holes. This is especially severe throughout the mid-tone region. The presence of a series of adjacent appendages and cavities is particularly stressful. The xerographic response to these binaries is neither robust nor repeatable. Increased levels of non-uniformity and contouring appear on print samples.

Figure 9B:
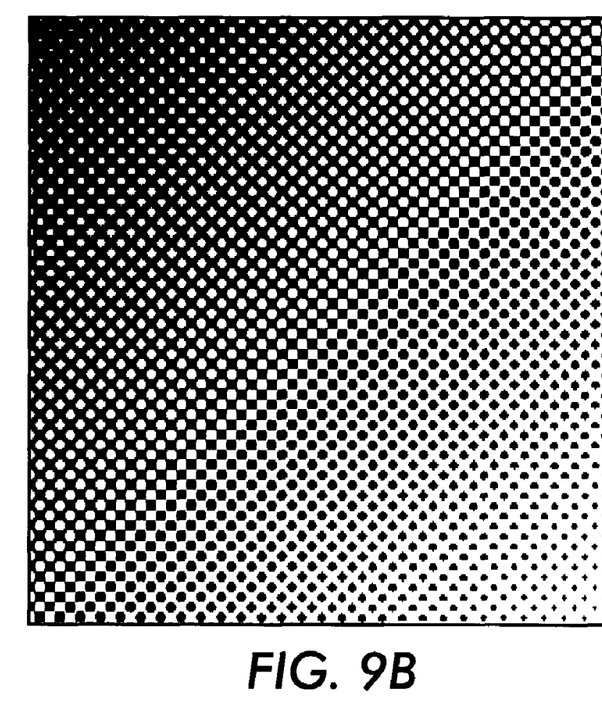

When MPPM is applied to the 1200×1200 binaries of FIG. 8B, the binaries of FIG. 9B are produced. As graphically shown, these binaries are compact. They are the exact same binaries that would have been produced by applying Dasy, the original optimized asymmetric halftone dot. These patterns are not stressful, and the resulting prints are more repeatable, and have less contouring and non-uniformity.

The halftone cell conversion or encoding process can be performed offline for each clustered dot design to be supported by a particular printer. For example, the conversion is performed by a software-based embodiment disclosed in Applicant's previously filed application referred to above. Then the resulting $D_{12\times 12}$ designs are loaded into the printer or RIP as the default 1200×1200 resolution dot designs.

When applying the method (MPPM) to a clustered screen, areas under conversion having threshold gradient directions may be determined to have obvious output resolution analogs. However, making the determination may unnecessarily complicate implementation and performance of the method (MPPM). Examining context when it is not absolutely necessary does not adversely effect conversion results. Therefore, the determination is usually made that contextual feature extraction should be performed. For example, as in the first example, three consecutive imaging element areas are examined.

Figure 10:
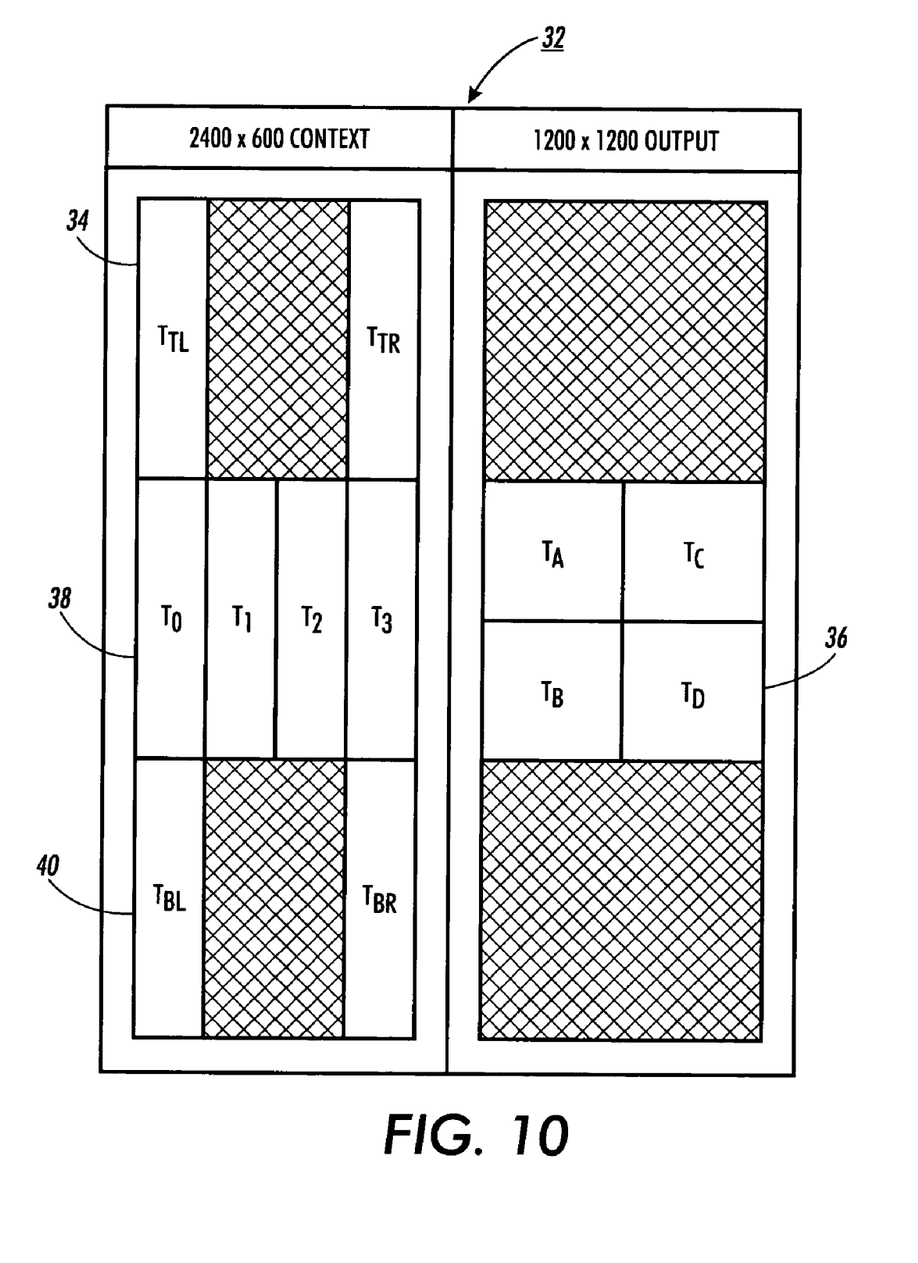
FIG. 10 is a generalized view of a halftone cell area under conversion having a first resolution and neighboring areas examined for context information and a generalized view or a halftone cell output pattern having a second resolution.

Since the resolutions in this second example are the same as in the first example, the imaging areas used can be the same size as described in the first example. However, referring to FIG. 10, due to the verticality of the strip-shaped pixels of the input resolution, 32, the three areas of context 38, 34, 40 are orthogonal. The imaging element area under conversion 38 is centered between neighboring areas 34, 40 that are examined for context information. The area under conversion 38 includes an array of thresholds T0, T1, T2, T3 associate with four vertical strip-shaped pixel areas. During the selection or generation of the related imaging element area output pattern, the thresholds T0, T1, T2, T3 will be assigned to square-shaped threshold or pixel locations TA, TB, TC, TD arranged in a square pattern as indicated in FIG. 10 by the output symmetric resolution 36. The context information of interest includes information regarding four pixels. Two of the four pixels are outer pixels of the neighboring area above the area 34 under conversion 38. They are referred to as the top-left (TL) and top-right (TR) pixels. The other two pixels are the outer pixels of the area 40 below the area under conversion 38. These pixels are referred to as the bottom-left (BL) and bottom-right (BR). The threshold assignment, or output pattern selection, is achieved through the application of the following two rules:

Rule 1: Since $T_0$ and $T_1$ ($T_2$ and $T_3$) are on the left-hand side (right-hand side) of the imaging area under test, these two thresholds must be assigned to $T_A$ and $T_B$ ($T_C$ and $T_D$), and Rule 2: If $T_{TL}>T_{BL}$, then $T_A$=max ($T_0$, $T_1$) and $T_B$=min ($T_0$, $T_1$), and visa versa if $T_{TL}<=T_{BL}$. This rule is applied similarly to $T_{TR}$, $T_{BR}$, $T_2$ and $T_3$.

In the given examples, the method (MPPM) is directed toward delivering or generating the pattern, which most nearly maintains area coverage (AC), x-centroid, y-centroid, and the number of transitions of the input area under conversion. For instance, in the exemplary embodiment of the first example, the AC statistic was of the highest priority.

In the binary conversion examples given here, only those patterns that are supported by the output resolution and minimize the AC error are considered. These output patterns are referred to as "candidates." From among these candidates, the centroid and transition statistics are used to further refine the pattern selection. The equations below in general terms how the candidates are evaluated in order to perform the selections as follows:

$$AC=(\Sigma_i p_i)/N,$$

where N is the integer valued number of identically sized addressable regions (pixels) in the imaging area, and $p_{i,i}=1, 2, \ldots N$ are the binary values [0 is white, 1 is black] of these regions, $$X\text{centroid}=(\Sigma_i x_i p_i)/N,$$

where $x_i$ is the value of the abscissa corresponding to the i'th region, $$Y\text{ centroid}=(\Sigma_i y_i p_i)/N,$$

where $y_i$ is the value of the ordinate corresponding to the i'th region, and

T=# of black-to-white and/or white-to-black transitions from left-to-right across the pattern, or 2; whichever is smaller.

Simulations have been used to generate prints on PPID, PID, and surrogate machines. Every high resolution halftone dot targeted for the surrogate machines have benefited from this invention. The custom dot designs and encoding has resulted in significant increases in print quality and repeatability.

To summarize and referring once again to FIG. 1, a design phase 18 is conducted for optimizing asymmetric halftone dots 20 using an encoding algorithm 24 are designed. Th encoding algorithm is based on the imbedded binary resolution conversion design (which is later used as a decoder). To implement 26 the method, one simply loads 28 the encoded (symmetric) halftone dot into the DFE. The resulting binaries will be decoded by the printers binary resolution conversion algorithm 30.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method comprising:
   optimizing asymmetric halftone dots;
   encoding the asymmetric halftone dot into a symmetric resolution format; and
   generating high resolution symmetric binaries using said encoded dots wherein resulting binaries will be decoded by a printer's imbedded binary resolution conversion algorithm.

2. The method according to claim 1 further comprising:
   optimizing halftone asymmetric dots by complying with rotation insensitivity.

3. The method according to claim 1 further comprising:
   optimizing halftone asymmetric dots to comply with a minimum dot size.

4. The method according to claim 3 further comprising:
   optimizing halftone asymmetric dots to a smallest robust imageable dot cluster wherein dot clusters that are smaller than this size will either fail to develop, their appearance will vary dramatically from one dot to a next, or their appearance will vary as a function of environmental factors such as temperature and atmospheric pressure.

5. The method according to claim 1 further comprising:
   optimizing halftone asymmetric dots to comply with a minimum hole size.

6. The method according to claim 5 further comprising:
   optimizing halftone asymmetric dots to a smallest robust imageable hole cluster wherein hole clusters that are smaller than this size will either fail to develop, their appearance will vary dramatically from one hole to a next, or their appearance will vary as a function of environmental factors such as temperature and atmospheric pressure.

7. The method according to claim 1 further comprising:
   optimizing halftone asymmetric dots to comply with a minimum appendage requirement.

8. The method according to claim 7 further comprising:
   optimizing halftone asymmetric dots to a smallest robust imageable appendage wherein appendages that are smaller than this size will either fail to develop, their appearance will vary dramatically from one dot to a next, or their appearance will vary as a function of environmental factors such as temperature and atmospheric pressure.

9. The method according to claim 1 further comprising:
   optimizing halftone asymmetric dots to comply with a minimum cavity requirement.

10. The method according to claim 9 further comprising:
    optimizing halftone asymmetric dots to a smallest robust imageable cavity wherein cavities that are smaller than this size will either fail to develop, their appearance will vary dramatically from one hole to a next, or their appearance will vary as a function of environmental factors such as temperature and atmospheric pressure.

11. A printer comprising:
    a digital front end having symmetric halftone dots which are encoded versions of optimized asymmetric halftone dots for generating high resolution symmetric binaries using said encoded dots wherein resulting binaries will be decoded by a printers imbedded binary resolution conversion algorithm.

12. The printer according to claim 11 wherein the asymmetric halftone dots comply with rotation insensitivity.

13. The printer according to claim 11 wherein the asymmetric halftone dots comply with minimum dot size.

14. The printer according to claim 13 wherein the asymmetric halftone dots employs a smallest robust imageable dot cluster wherein dot clusters that are smaller than this size will either fail to develop, their appearance will vary dramatically from one dot to a next, or their appearance will vary as a function of environmental factors such as temperature and atmospheric pressure.

15. The printer according to claim 11 wherein the asymmetric halftone dots comply with a minimum hole size.

16. The printer according to claim 15 wherein the asymmetric halftone dots employs a smallest robust imageable hole cluster wherein hole clusters that are smaller than this size will either fail to develop, their appearance will vary dramatically from one dot to a next, or their appearance will vary as a function of environmental factors such as temperature and atmospheric pressure.

17. The printer according to claim 11 wherein the asymmetric halftone dots comply with a minimum appendage requirement.

18. The printer according to claim 15 wherein the asymmetric halftone dots employs a smallest robust imageable appendage wherein appendages that are smaller than this size will either fail to develop, their appearance will vary dramatically from one dot to a next, or their appearance will vary as a function of environmental factors such as temperature and atmospheric pressure.

19. The printer according to claim 11 wherein the asymmetric halftone dots comply with a minimum cavity requirement.

20. The printer according to claim 15 wherein the asymmetric halftone dots employs a smallest robust imageable cavity wherein cavities that are smaller than this size will either fail to develop, their appearance will vary dramatically from one dot to a next, or their appearance will vary as a function of environmental factors such as temperature and atmospheric pressure.

21. A method comprising:

optimizing asymmetric halftone dots for rotation insensitivity, minimum dot size, minimum hole size, minimum appendage, and minimum cavity;

encoding the asymmetric halftone dot into a symmetric resolution format;

generating high resolution symmetric binaries using said encoded dots wherein resulting binaries will be decoded by the printers imbedded binary resolution conversion algorithm satisfies the requirements of raster output scanner electronics.

* * * * *